United States Patent
Hayashi (10) Patent No.: US 10,173,715 B2
(45) Date of Patent: Jan. 8, 2019

(54) ROTATING ELECTRICAL MACHINE

(71) Applicant: DENSO CORPORATION, Kariya, Aichi-pref. (JP)

(72) Inventor: Jirou Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 313 days.

(21) Appl. No.: 15/001,673

(22) Filed: Jan. 20, 2016

(65) Prior Publication Data

US 2016/0218583 A1    Jul. 28, 2016

(30) Foreign Application Priority Data

Jan. 26, 2015    (JP) .................................. 2015-12479

(51) Int. Cl.

| H02K 5/10 | (2006.01) |
|---|---|
| B62D 5/04 | (2006.01) |
| H02K 9/22 | (2006.01) |
| H02K 11/33 | (2016.01) |

(52) U.S. Cl.
CPC ............. *B62D 5/04* (2013.01); *B62D 5/0406* (2013.01); *H02K 5/10* (2013.01); *H02K 9/22* (2013.01); *H02K 11/33* (2016.01)

(58) Field of Classification Search
CPC .......... H02K 5/00–5/136; H02K 11/30–11/38; H02K 5/02; H02K 5/04; H02K 5/08; H02K 5/10
See application file for complete search history.

(56) References Cited

U.S. PATENT DOCUMENTS

| 5,900,686 | A | 5/1999 | Tabata et al. | |
|---|---|---|---|---|
| 6,037,726 | A | 3/2000 | Tabata et al. | |
| 6,054,818 | A | 4/2000 | Tabata et al. | |
| 9,730,311 | B2 * | 8/2017 | Ichikawa | H05K 1/0203 |
| 2007/0069841 | A1 * | 3/2007 | Kusano | H02K 3/522 |
| | | | | 335/202 |
| 2012/0229005 | A1 | 9/2012 | Tominaga et al. | |
| 2013/0257232 | A1 | 10/2013 | Tomizawa et al. | |
| 2016/0036299 | A1 | 2/2016 | Hayashi | |

FOREIGN PATENT DOCUMENTS

| JP | 2012-070508 A | 4/2012 | |
|---|---|---|---|
| JP | WO 2014080572 A1 * | 5/2014 | ......... F04C 18/0215 |

* cited by examiner

*Primary Examiner* — Ramon M Barrera (57) ABSTRACT

A stator is fixed to a frame of an electric motor. A rotor is rotatably mounted to the frame to face the stator in a radial direction. A heat sink, to which a control substrate is attached, is mounted in an opening of the frame. A motor cover is attached to a front end of the frame to cover the heat sink. An adhesive groove, which has a fixed depth and is filled with an adhesive, is formed on the front end. A joining portion is formed on the rear end of the motor cover, and is inserted into the adhesive groove is an axis of rotation direction to join the motor cover with the frame in a liquid-tight manner.

7 Claims, 9 Drawing Sheets

ROTATING ELECTRICAL MACHINE

CROSS REFERENCE TO RELATED APPLICATION

The present application is based on Japanese Patent Application No. 2015-012479 filed on Jan. 26, 2015, disclosure of which is incorporated herein by reference.

TECHNICAL FIELD

The present disclosure relates to a rotating electrical machine that generates electricity by rotating a rotor, or that rotates a rotor when supplied with electric power.

BACKGROUND

Conventionally, a rotating electrical machine includes a motor case that opens in one end in an axis of rotation direction. A stator is fixed to an inner circumferential surface of the motor case. A rotor is rotatably mounted in the motor case so as to face the stator in a radial direction. See, for example, JP 2013-207968. In such a conventional rotating electrical machine, the motor case includes a motor case body, a front frame end, and a rear frame end. The stator is fixed to the motor case body. Further, the front frame end and the rear frame end are attached to either end of the motor case body. A shaft is fixed to the rotor, and is rotatably mounted in the front frame end and the rear frame end.

SUMMARY

In the above described conventional rotating electrical machine, a heat sink is screwed to the rear frame end. A control substrate and the like is mounted on the heat sink. Further, a control unit case is attached to the rear frame end by screws to cover the heat sink. Accordingly, joining portions are formed at three locations: at either end of the motor case body, as well as between the rear frame end and the control unit case. At each of these joining portions, an O-ring is interposed between the pair of components to prevent outside water and the like from entering.

As such, in this conventional rotating electrical machine, a large number of joining portions are formed around the motor case. As a result, in order to maintain the sealing property of the joining portions, the dimensional precision of many components must be increased. Accordingly, there may be problems encountered when manufacturing the rotating electrical machine, or manufacturing costs may rise due to an increase in the number of components. Further, since a seal member such as an O-ring is disposed at each joining portion, the component dimensions may increase, such that the physical size of the rotating electrical machine may increase.

In view of the above, an object of the present disclosure is to provide a rotating electrical machine that may be easily manufactured in a small size.

In view of the above, according to the present disclosure, there is provided a rotating electrical machine including a housing integrally formed of a cylinder portion having one end in an axis of rotation direction, the one end being open, and a bottom portion connected to an other end of the cylinder portion in the axis of rotation direction, the bottom portion extending inward in a radial direction, a stator fixed to a inner circumferential surface of the cylinder portion, a rotor rotatably mounted in the housing to face the stator in the radial direction, a heat sink disposed to close an opening of the housing, a control substrate connected to the heat sink, the control substrate controlling a supply of electric power to the stator, and a cover member joined to the one end of the housing in a liquid-tight manner to cover the heat sink, the cover member being integrally formed.

According to this configuration, the integrally formed cover member is joined to the one end of the integrally formed housing in a liquid-tight manner to cover the heat sink. Accordingly, the elements which separate the inside and outside of the rotating electrical machine may be only joined at one location. As a result, the rotating electrical machine may be easily manufactured by reducing the number of components that have a high measurement precision while still maintaining sealability. Further, the number of sealing components may be reduced, and thus the cost and physical size of the rotating electrical machine may be reduced.

Further, the stator and the heat sink are mounted to the housing. As a result, heat generated at the stator and the control substrate may be dissipated through the housing, and thus heat dissipation by the rotating electrical machine may be improved.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION (First Embodiment)
(Configuration of Electric Power Steering Device)

Figure 1:
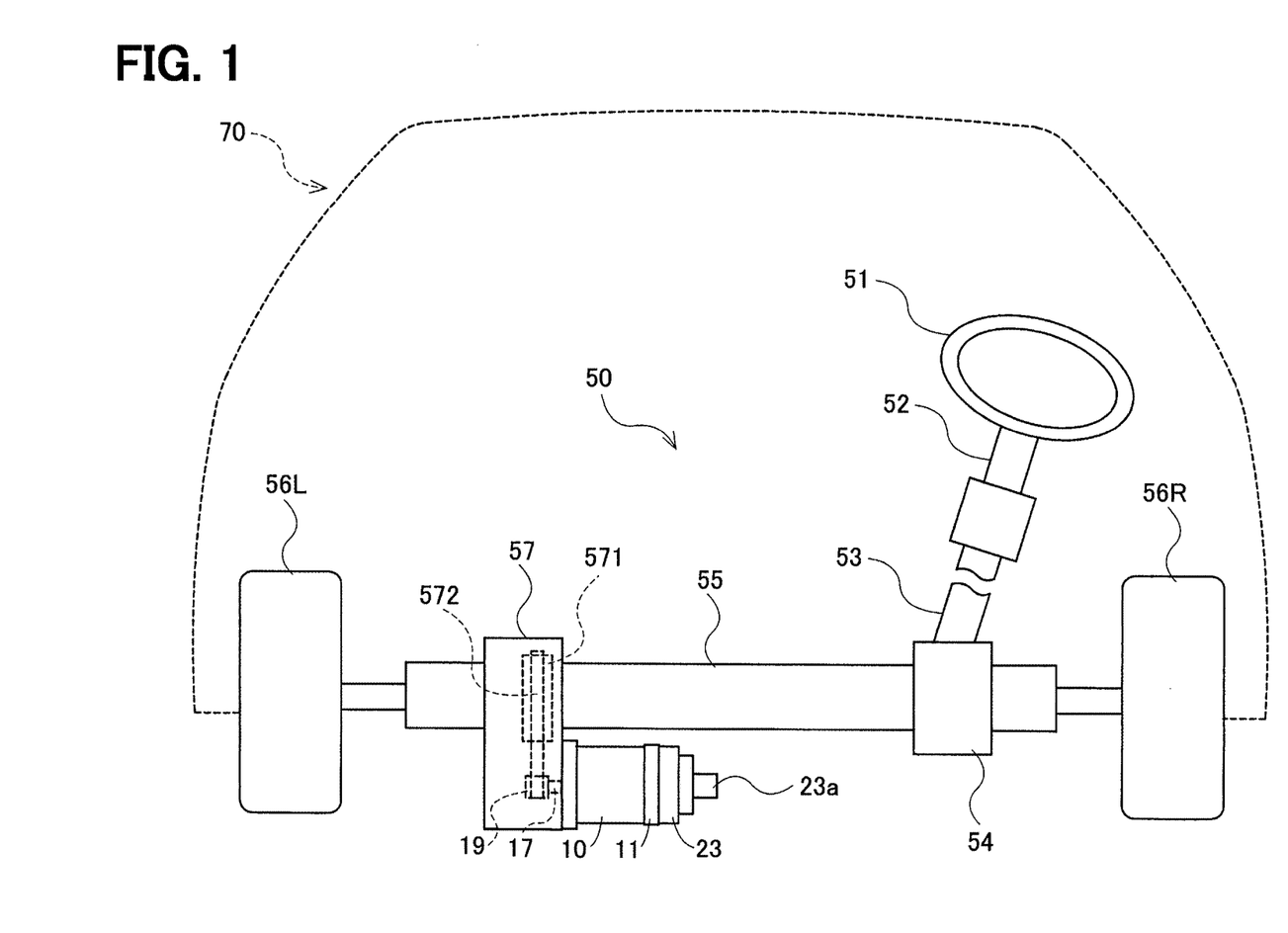
FIG. 1 is a simplified view of an electric power steering device mounted on a vehicle according to a first embodiment of the present disclosure.

An electric power steering device 50 that includes an electric motor 10 (corresponding to a rotating electrical machine) according to a first embodiment of the present disclosure will be explained with reference to FIG. 1. As shown in FIG. 1, the electric power steering device 50 is mounted in a vehicle 70, and includes a steering wheel 51 that is rotatably operated by a driver. A steering shaft 52 connects the steering wheel 51 to an intermediate shaft 53. The intermediate shaft 53 is connected through a rack and pinion mechanism 54 to a rack shaft 55. The two ends of the rack shaft 55 are connected to a pair of steered wheels 56R, 56L (corresponding to wheels of a vehicle).

Accordingly, when the steering wheel 51 is rotatably operated, the rotation motion is transmitted through the steering shaft 52 and the intermediate shaft 53, and this rotation motion is converted by the rack and pinion mechanism 54 into a linear motion of the rack shaft 55 in an axial direction. As the rack shaft 55 moves in the axial direction, the steered wheels 56R, 56L are steered by an angle commensurate with the operation amount applied to the steering wheel 51.

The rack shaft 55 is connected to an electric motor 10 through a power transmission device 57. Specifically, the rack shaft 55 is engaged to a driven-side pulley 571 included in the power transmission device 57. The driven-side pulley 571 is rotatable with respect to the rack shaft 55, and is disposed inside the power transmission device 57 so as to be immovable in the axis of rotation direction (the left-right direction in FIG. 1). The driven-side pulley 571 is connected by a driving belt 572 to a driving-side pulley 19 of the electric motor 10. The outer diameter of the driving-side pulley 19 is configured to be smaller than the outer diameter of the driven-side pulley 571.

According to the above configuration, when the electric motor 10 is driven, rotation of the electric motor 10 is reduced by the driving belt 572 and transmitted to the driven-side pulley 571. Rotation of the driven-side pulley 571 acts as an assist force that causes the rack shaft 55 to linearly move. As a result, the electric motor 10 provides assisting steering force to the steered wheels 56R, 56L.

(Configuration of Electric Motor)

Figure 2:
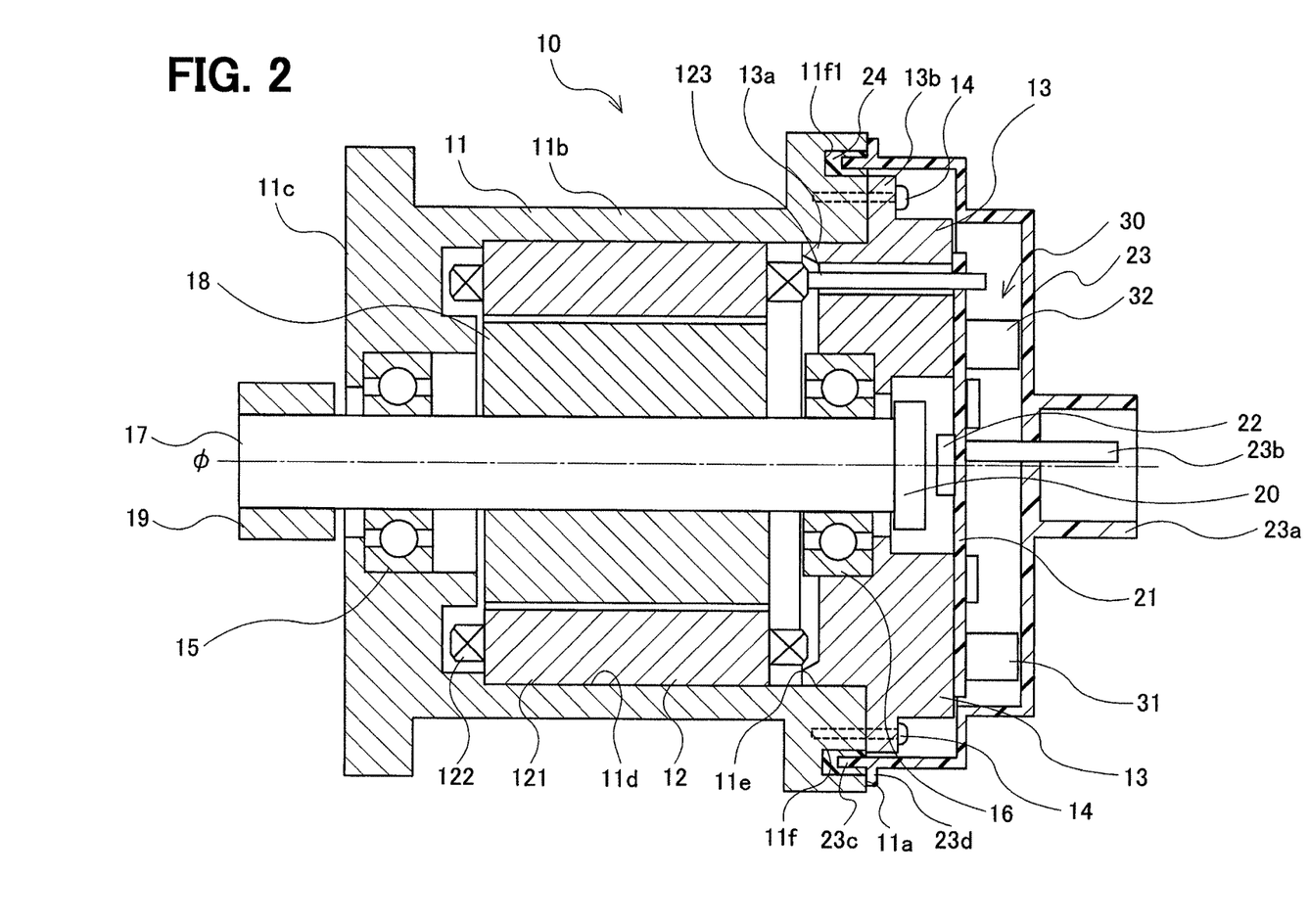
FIG. 2 is a cross sectional view along an axis of rotation of an electric motor shown in FIG. 1.

Next, the configuration of the electric motor 10, which is included in the electric power steering device 50, will be explained with reference to FIG. 2. In FIG. 2, the center of rotation of a rotor shaft 17 is shown as an axis of rotation ϕ. Further, in the below explanation, the direction in which the axis of rotation ϕ extends will be simply referred to as the axis of rotation direction. In addition, in the axis of rotation direction, the side closer toward the driving-side pulley 19 (i.e., the left side in FIG. 2) is the rear side of the electric motor 10, while the opposite side (i.e., the right side in FIG. 2) is the front side of the electric motor 10. Further, a direction from the outer peripheral of the electric motor 10 toward the rotor shaft 17 will be referred to as radially inward, while the opposite direction will be referred to as radially outward.

As described above, the electric motor 10 of the present embodiment is for assisting steering in the vehicle 70 that the electric power steering device 50 is mounted in. However, the electric motor 10 of the present disclosure is not limited to such a use. The electric motor 10 may be used to drive vehicle devices aside from the electric power steering device 50, to drive general industrial machinery, to drive residential appliances, and such. Further, the electric motor 10 of the present embodiment is formed from a brushless DC motor, but is not limited to this example. The electric motor 10 may be a synchronous motor, an induction motor, or other types of electric motors.

As shown in FIG. 2, the electric motor 10 includes a frame 11 (corresponding to a housing) integrally formed from an aluminum alloy or a resin material with good thermal conductivity. The frame 11 includes a cylinder portion 11b and a bottom portion 11c. The cylinder portion 11b is substantially cylindrical and includes a front end 11a in the axis of rotation direction (corresponding to one end in the axis of rotation direction) that is open. The bottom portion 11c is connected to the rear end of the cylinder portion 11b in the axis of rotation direction (corresponding to an other end in the axis of rotation direction), and extends radially inward. A stator 12 is attached to an inner circumferential surface 11d of the cylinder portion 11b by shrink fitting or press fitting. The stator 12 is formed by winding a stator coil 122 on each teeth of a substantially cylindrical stator core 121 formed from a plurality of laminated magnetic steel sheets.

A heat sink 13 is disposed in the front end 11a of the frame 11 to close an opening 11e (corresponding to an opening portion) of the frame 11. The heat sink 13 is formed from a metal with good heat conductivity such as an aluminum alloy, copper, or the like, and has a volume sufficient to dissipate heat generated by a control substrate 21 which will be explained later. The heat sink 13 includes a rear end portion 13a which is inserted from the opening 11e into the inside of the frame 11, and the rear end portion 13a is fitted with the inner circumferential surface 11d of the cylinder portion 11b. Fitting screws 14 penetrate a flange portion 13b of the heat sink 13 to screw the flange portion 13b to the frame 11. As a result, the heat sink 13 is fixed to the frame 11.

A rear bearing 15 (corresponding to a first bearing) is mounted at an inner periphery edge of the bottom portion 11c of the frame 11. Further, a front bearing 16 (corresponding to a second bearing) is mounted at an inner periphery portion of the heat sink 13. The rotor shaft 17 (corresponding to a shaft) is rotatably mounted in the frame 11 and the heat sink 13 through the rear bearing 15 and the front bearing 16.

The rotor shaft 17 is fixedly press fit with a rotor 18. Accordingly, the rotor 18 is rotatably mounted with respect to the frame 11 and the heat sink 13. The rotor 18 is positioned to face the stator 12 in the radial direction with a fixed gap therebetween. Here, the rotor 18 is formed by placing a plurality of field pole magnets (not illustrated) within a rotor core of laminated steel sheets. As described below, when the stator coil 122 is supplied with power, a rotating magnetic field is generated. Then, the rotor 18 rotates due to the resulting attraction and repulsion forces.

Further, the driving-side pulley 19 as described previously is fixed to the rear end of the rotor shaft 17. As described previously, the driven-side pulley 571 of the power transmission device 57 is connected to the driving-side pulley 19 through the driving belt 572. Moreover, a sensor magnet 20 is attached to the front end of the rotor shaft 17.

A control substrate 21 is fixed to the front surface of the heat sink 13 by a plurality of screws (not illustrated) such that the control substrate 21 abuts the front surface of the heat sink 13. The control substrate 21 is a printed circuit board formed from epoxy resin. A controller 30 that controls a rotation of the rotor 18 is formed on the control substrate 21. As shown in FIG. 2, the controller 30 includes a choke coil 31 and a capacitor 32 formed on the front surface of the control substrate 21. In addition to these elements, an inverter 33 (which will be explained with reference to FIG. 3) and the like is also provided on the rear surface of the control substrate 21. The inverter 33 is formed from a plurality of MOS-FETs (metal-oxide-semiconductor field effector transistor). Heat generated by each of these heat generating elements on the control substrate 21 is dissipated by the heat sink 13.

Further, the control substrate 21 is connected to the stator coil 122 through a conductor 123 that penetrates through the heat sink 13, in order to supply electric power to the stator coil 122. As a result, heat generated at the control substrate 21 is also transmitted through the conductor 123 to the stator core 121, and this heat is then transmitted to the frame 11 to be dissipated.

A rotation angle sensor 22 is attached to the rear surface of the control substrate 21 so as to face the previously described sensor magnet 20. The rotation angle sensor 22 is formed from a magnetic resistive element or a Hall element, and detects a rotation angle of the rotor 18 by sensing changes in the magnetic field generated by the sensor magnet 20.

A motor cover 23 (corresponding to a cover member) is connected to the front end 11*a* of the frame 11 so as to cover the control substrate 21 and the heat sink 13. The motor cover 23 is integrally formed from synthetic resins and is substantially dish shaped. A water proof connector 23*a* is formed on the front surface of the motor cover 23. A connector terminal 23*b* that protrudes frontward from the control substrate 21 is inserted into the waterproof connector 23*a*.

An adhesive groove 11*f* is formed in the front end 11*a* of the frame 11. The adhesive groove 11*f* has a fixed depth in the axis of rotation direction, and is filled with an adhesive 24. The adhesive 24 is waterproof and silicon-based. Further, the adhesive 24 is heat resistant and is an electrical insulator. A joining end 23*c* (corresponding to a joining portion) is formed on the rear end of the motor cover 23. The joining end 23*c* is immersed in the adhesive 24. As a result, the joining end 23*c* of the motor cover 23 and the front end 11*a* of the frame 11 are joined in a liquid-tight manner. The junction structure between the motor cover 23 and the frame 11 will be explained in detail below with reference to FIG. 4.

(Circuit Configuration of Controller)

Figure 3:
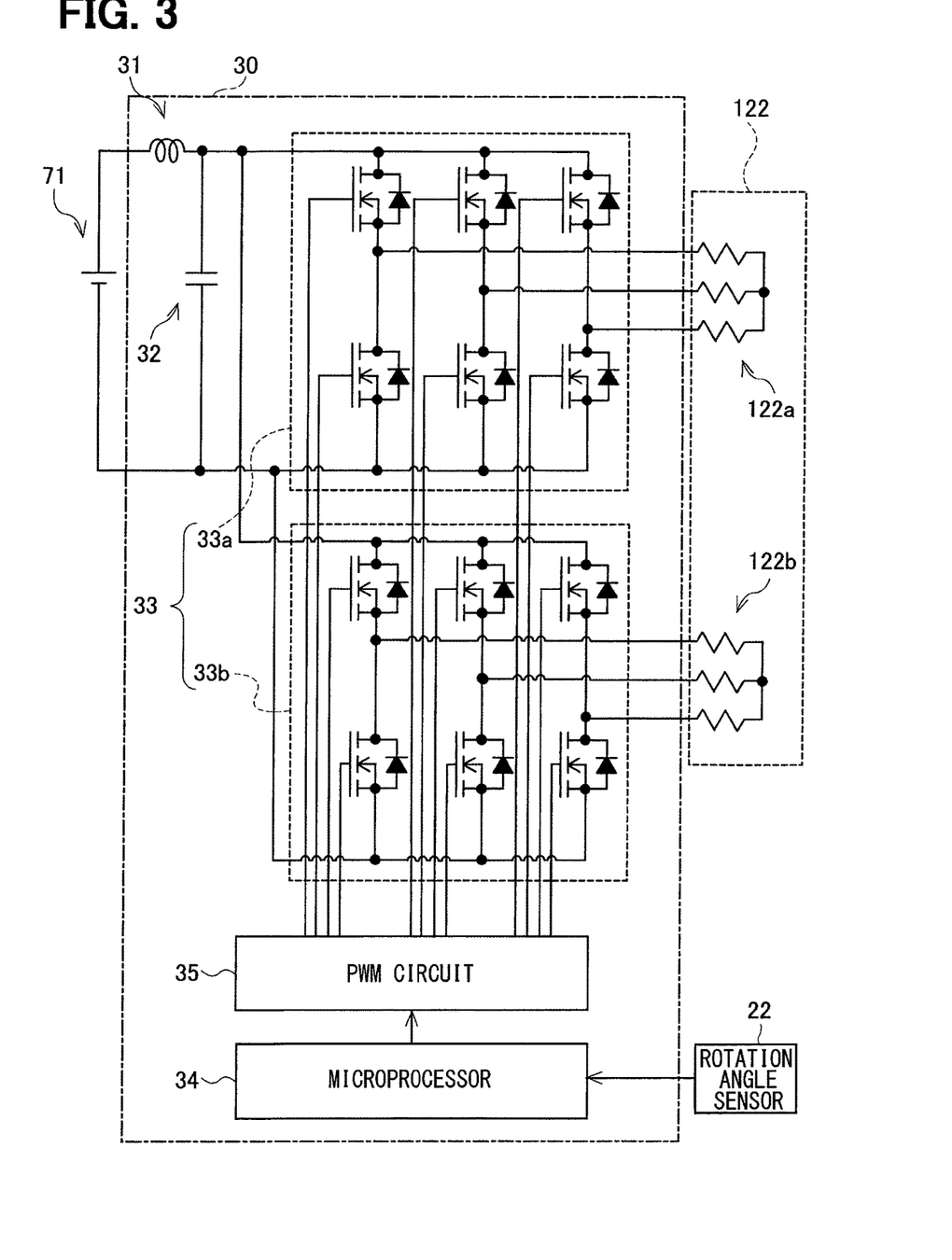
FIG. 3 is a circuit diagram of a controller of an electric motor.

Next, an explanation of the controller 30 formed on the control substrate 21 will be provided with reference to FIG. 3. A vehicle battery 71 mounted on the vehicle 70 is connected to the choke coil 31 and the capacitor 32 of the controller 30. The choke coil 31 and the capacitor 32 form a filter that reduces noise leaking into the controller 30 as well as noise leaking out from the controller 30. Further, the choke coil 31 smoothes the voltage from the vehicle battery 71, and reduces the pulsations of this voltage.

As shown in FIG. 3, the previously described stator coil 122 may be formed from two sets of three-phase windings 122*a*, 122*b*. The inverter 33 includes two systems of inverter circuits 33*a*, 33*b* which are connected to the three-phase windings 122*a*, 122*b*, respectively, in order to supply three-phase AC current to the three-phase windings 122*a*, 122*b*.

The rotation angle sensor 22 is connected to a microprocessor 34 included in the controller 30. The microprocessor 34 generates a three-phase voltage control signal based on detection values from the rotation angle sensor 22, a torque sensor (not illustrated) of the vehicle 70, and the like. The microprocessor 34 then sends the three-phase voltage control signal to a PWM (pulse width modulation) circuit 35. The PWM circuit 35 generates a PWM signal based on the three-phase voltage control signal, and transmits the PWM signal to the inverter circuits 33*a*, 33*b*. Each of the inverter circuits 33*a*, 33*b* are switched according to the PWM signal, generates a requested AC voltage, and supplies the AC voltage to the three-phase windings 122*a*, 122*b*.

Further, in the configuration of the controller 30 shown in FIG. 3, some electric components may be omitted, and some electric components or circuits which are not illustrated may be added.

(Junction Structure Between Motor Cover and Frame)

Figure 4:
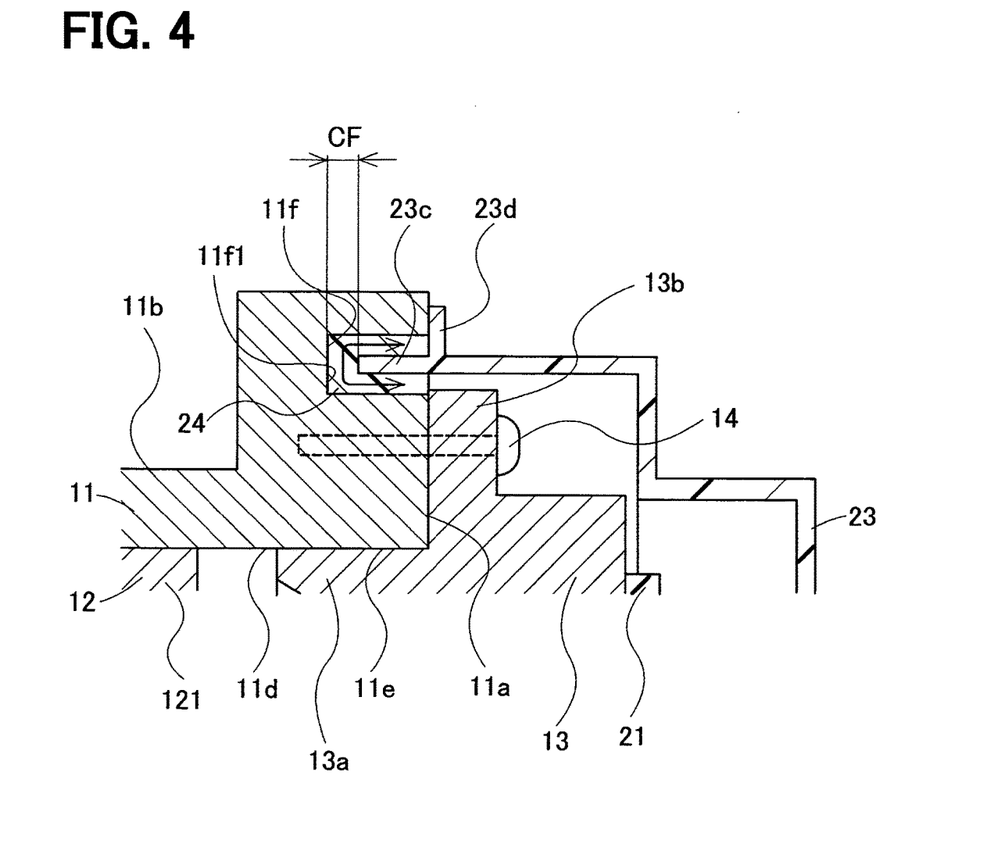
FIG. 4 is an enlarged view of the electric motor of FIG. 2.

Next, the junction structure between the motor cover 23 and the frame 11 will be explained with reference to FIG. 4. As shown in FIG. 4, the motor cover 23 includes a plurality of locking strips 23*d* (corresponding to a stopper portion) that extend outward radially from the joining end 23*c*. Alternatively, the locking strips 23*d* may extend inward radially from the joining end 23*c* instead. The locking strips 23*d* abut the front end 11*a* of the frame 11 in the axis of rotation direction. In other words, the joining end 23*c* is inserted into the adhesive groove 11*f* along the axis of rotation direction until the locking strips 23*d* abut the front end 11*a* of the frame 11.

When the joining end 23*c* is inserted into the adhesive groove 11*f*, a fixed liquidity gap CF is formed between the tip of the joining end 23*c* and the bottom surface 11*f*1 of the adhesive groove 11*f*. While the joining end 23*c* is inserted into the adhesive groove 11*f*, the filled adhesive 24 is initially in a gel state. After time passes, with or without heating, the adhesive 24 hardens. The liquidity gap CF is set at or above a size such that when the motor cover 23 is joined with the frame 11, liquidity of the adhesive 24 between the tip of the joining end 23*c* and the bottom surface 11*f*1 is not hindered.

(Assembly of Electric Motor)

Next, a simple explanation of a method of assembling the electric motor 10 will be provided with reference to FIGS. 5A to 5D. The following process is followed when assembling the electric motor 10.

Figure 5A:
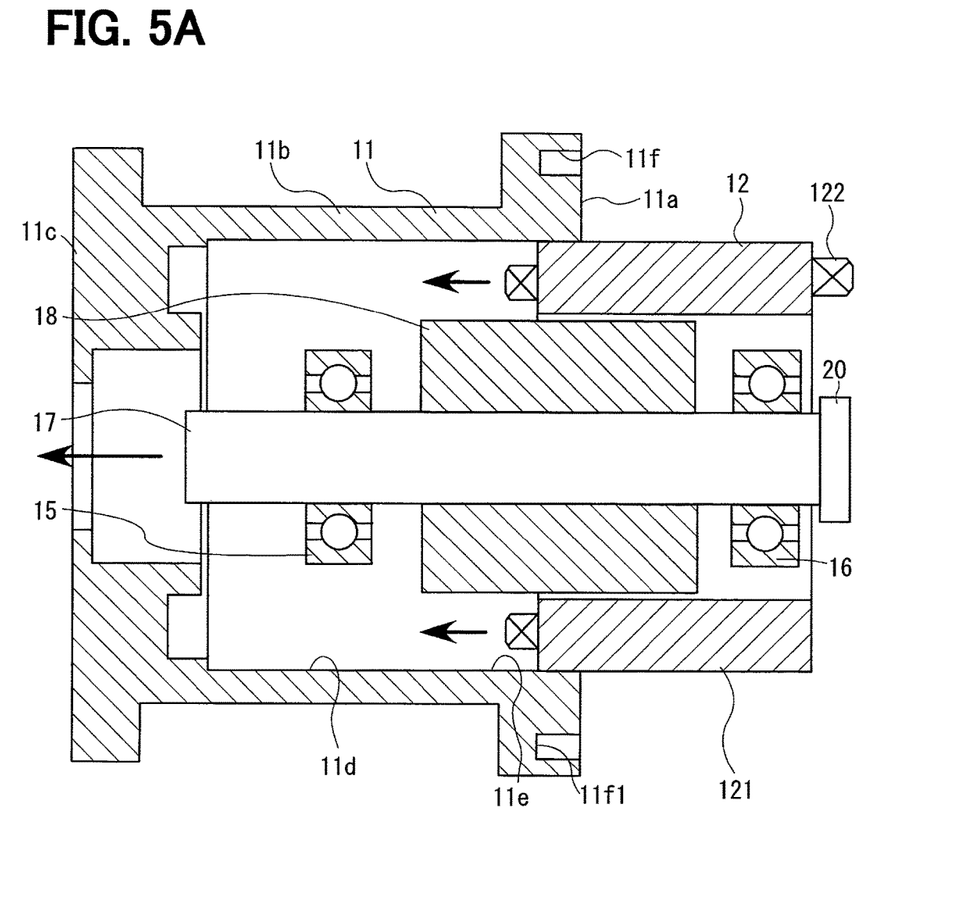
FIG. 5A is a simplified view showing an assembly process of an electric motor in which a rotor and a stator are mounted to a frame.

(i) The rotor shaft 17, which is press fit into the rotor 18, is mounted in the frame 11 along with the rear bearing 15 and the front bearing 16. Further, the stator 12 is inserted into the frame 11 (rotor and stator mounting step: FIG. 5A).

Figure 5B:
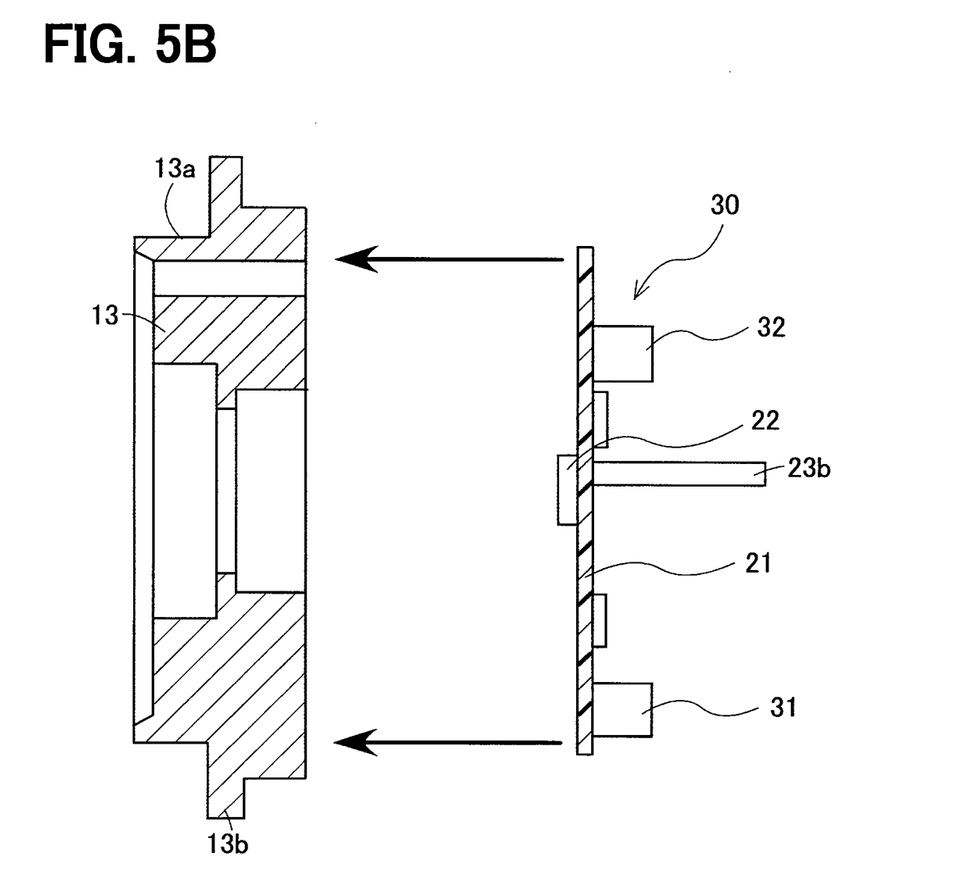
FIG. 5B shows a step of mounting a control substrate to a heat sink.

(ii) The control substrate 21 is mounted to the front surface of the heat sink 13 with a plurality of screws (control substrate mounting step: FIG. 5B).

Figure 5C:
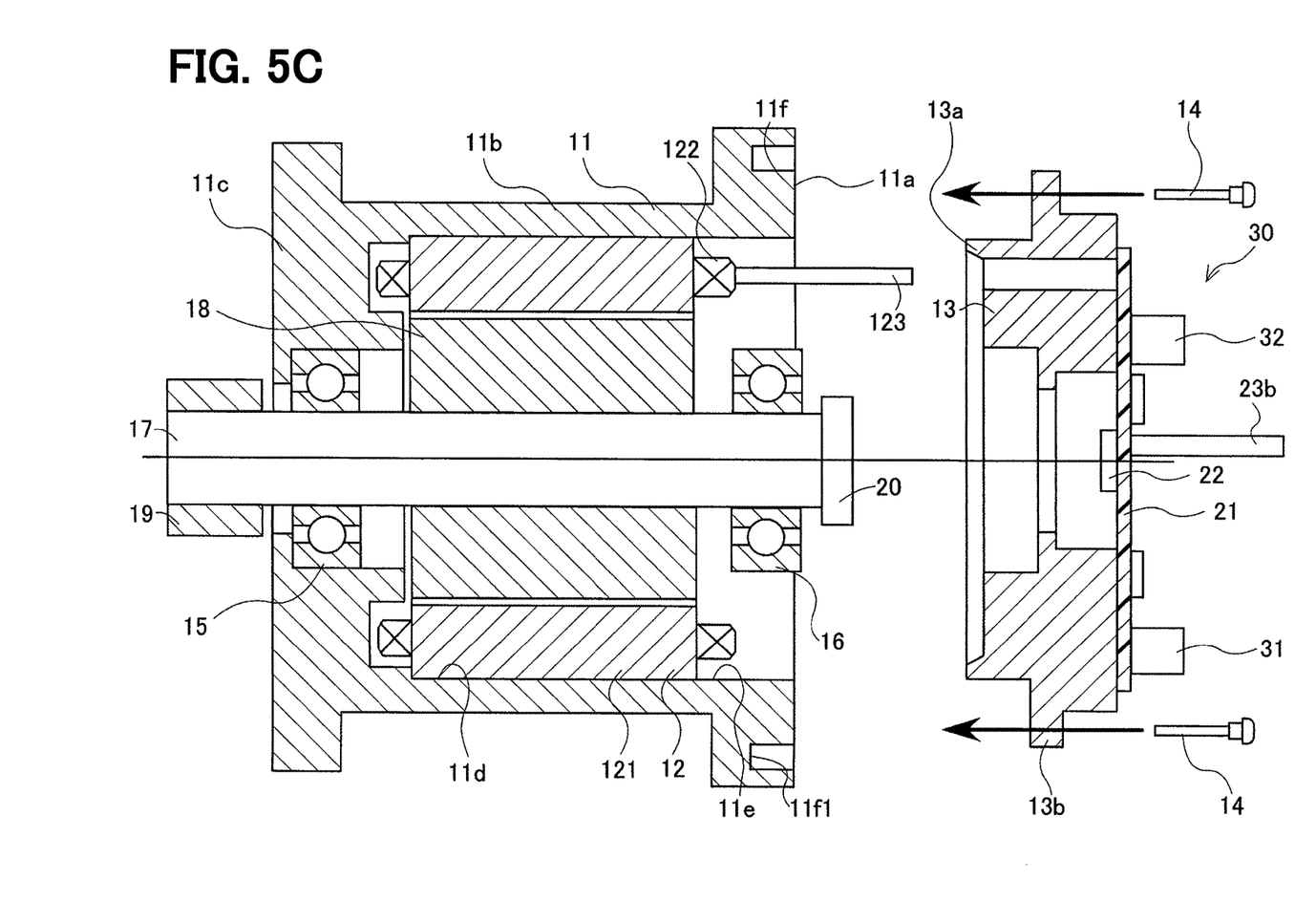
FIG. 5C shows a step of mounting a heat sink to a frame.

(iii) The heat sink 13 is mounted in the opening 11*e* of the frame 11 with the fitting screws 14 (heat sink mounting step: FIG. 5C).

Figure 5D:
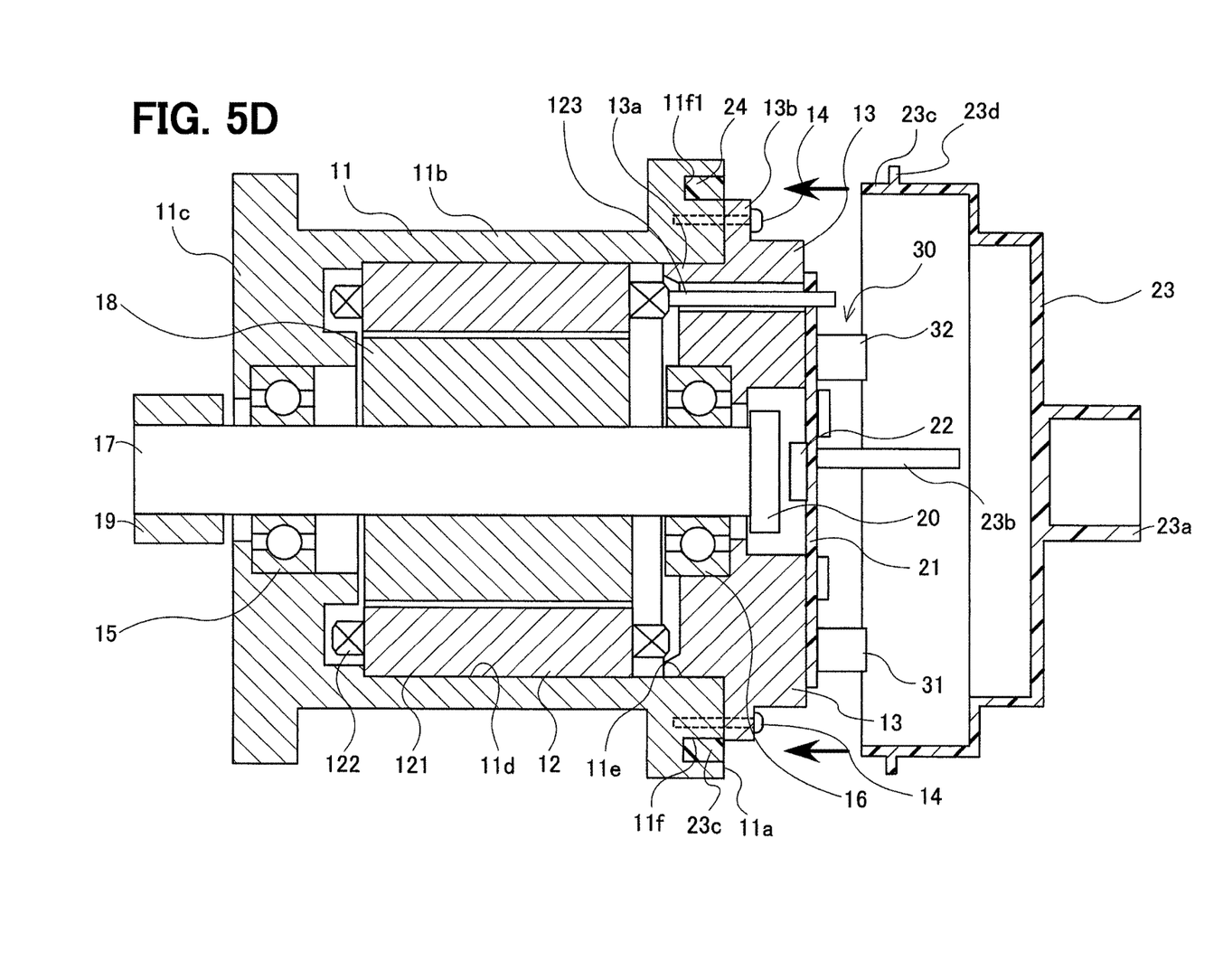
FIG. 5D shows a step of mounting a motor cover to a frame.

(iv) While the motor cover 23 is positioned in the radial direction with a jig, the joining end 23*c* is inserted into the adhesive groove 11*f*. At this time, the adhesive groove 11*f* is filled with the adhesive 24 and the adhesive 24 hardens, and thus the frame 11 is joined to the motor cover 23 (motor cover mounting step: FIG. 5D).

(Effects of First Embodiment)

According to the present embodiment, the integrally formed motor cover 23 is joined to the front end 11*a* of the integrally formed frame 11 in a liquid-tight manner, with the motor cover 23 covering the heat sink 13. Accordingly, the frame 11 and the motor cover 23 may form a division between the inside and outside of the electric motor with only one joining portion. As a result, the electric motor 10 may be easily manufactured by reducing the number of components that have a high measurement precision while still maintaining sealability. Further, the number of sealing components may be reduced, and thus the cost and physical size of the electric motor 10 may be reduced.

In addition, the stator 12 and the heat sink 13 are mounted to the frame 11. Accordingly, heat generated at the stator coil 122 and the control substrate 21 may be dissipated through the frame 11 to the outside, and thus heat dissipation by the electric motor 10 may be improved.

Further, an adhesive 24 is used to join the joining end 23*c* of the motor cover 23 with the front end 11 a of the frame 11. Accordingly, when joining the motor cover 23 with the frame 11, fastening components such as bolts are not needed, and the motor cover 23 may be easily joined with the frame 11.

In addition, the front end 11*a* of the frame 11 includes the adhesive groove 11*f* which has a fixed depth in the axis of rotation direction and is filled with the adhesive 24. Further, the joining end 23c of the motor cover 23 is inserted into the adhesive groove 11f along the axis of rotation direction. By setting the length of the joining end 23c, which is inserted into the adhesive groove 11f, to be sufficiently long, the joining force between the joining end 23c and the front end 11a may be increased without increasing the size of the electric motor 10.

Figure 6:
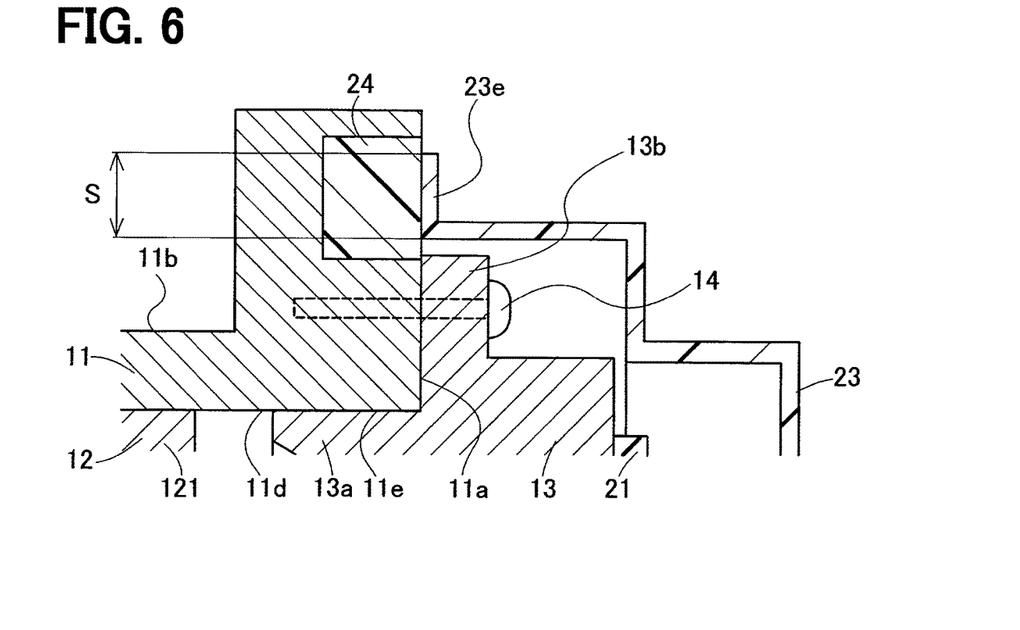
FIG. 6 is an enlarged view of a reference example electric motor as compared to FIG. 4.

In contrast, FIG. 6 shows a hypothetical motor cover 23 with an adhesive strip 23e that extends in the radial direction. The adhesive strip 23e is joined to the adhesive 24. In this case, in order to increase the joining force between the motor cover 23 and the frame 11, the contact length S of the adhesive strip 23e in the radial direction must be increased, and as a result the size of the electric motor 10 will increase in the radial direction. In this regard, in the case of the electric motor 10 of the present embodiment, the adhesive groove 11f may be disposed along the length of the front end 11a in the axis of rotation direction, and thus the size of the electric motor 10 may be maintained.

Further, the motor cover 23 includes the locking strips 23d that extend from the joining end 23c in the radial direction. The locking strips 23d abut the front end 11a of the frame 11 in the axis of rotation direction. Accordingly, the joining end 23c may be positioned respect to the front end 11a of the frame 11, thereby eliminating variations in how deep the joining end 23c is inserted into the adhesive groove 11f.

In addition, the fixed liquidity gap CF is disposed between the tip of the joining end 23c and the bottom surface 11f1 of the adhesive groove 11f. Accordingly, when joining the motor cover 23 to the frame 11, the liquidity of the adhesive 24 between the joining end 23c and the bottom surface 11f1 is improved (see the arrows in the adhesive 24 in FIG. 4). As a result, the adhesive 24 is evenly distributed in the adhesive groove 11f, and the joining force between the motor cover 23 and the frame 11 may be increased.

Further, the rear bearing 15 is mounted at the inner periphery edge of the bottom portion 11c of the frame 11, and the front bearing 16 is mounted at the inner periphery portion of the heat sink 13. Then, the rotor shaft 17 is rotatably mounted in the frame 11 and the heat sink 13 through the rear bearing 15 and the front bearing 16. The rotor 18 is fixed to the rotor shaft 17. Accordingly, the rotor shaft 17 is retained between the inner peripheral edge of the frame 11 to which the stator 12 is mounted, and the inner peripheral edge of the heat sink 13 which is joined to the frame 11. As a result, the concentricity of the rotor 18 with respect to the stator 12 may be improved.

It should be noted that when machining the frame 11, the step of forming the inner circumferential surface 11d and the step of forming the engagement portion for the rear bearing 15 may be performed in succession without removing the frame 11 from a chuck. Further, when machining the heat sink 13, the step of forming the engagement portion for the frame 11 and the step of forming the engagement portion for the front bearing 16 may be performed in succession without removing the heat sink 13 from a chuck. As a result, the concentricity of the rotor 18 with respect to the stator 12 may be further improved. Further, if the inner circumferential surface 11d and the engagement portion for the rear bearing 15 are simultaneously machined on the frame 11 using a stepped cutter or the like, and if the engagement portion for the frame 11 and the engagement portion for the front bearing 16 are simultaneously machined on the heat sink 13, the concentricity of the rotor 18 with respect to the stator 12 may be further improved.

Further, the front bearing 16 is mounted on the inner periphery of the heat sink 13, and the rear bearing 15 is mounted on the bottom portion 11c of the frame 11. Accordingly, heat generated by the front bearing 16 may be dissipated through the heat sink 13, and heat generated by the rear bearing 15 may be dissipated through the frame 11, thereby improving heat dissipation.

Further, since the front bearing 16 is mounted to the inner periphery of the heat sink 13, it is not necessary to specifically provide a mounting member for the front bearing 16. Accordingly, the electric motor 10 may be miniaturized in the axis of rotation direction, and the number of components in the electric motor 10 may be reduced.

In addition, the electric motor 10 is included in the electric power steering device 50, and provides assisting steering force to the steered wheels 56R, 56L of the vehicle 70. Thus, since the electric motor 10 according to the configuration of the present embodiment may be miniaturized, the electric power steering device may be easily positioned within the narrow spaces around the steered wheels 56R, 56L without sacrificing performance.

(Second Embodiment)

Figure 7:
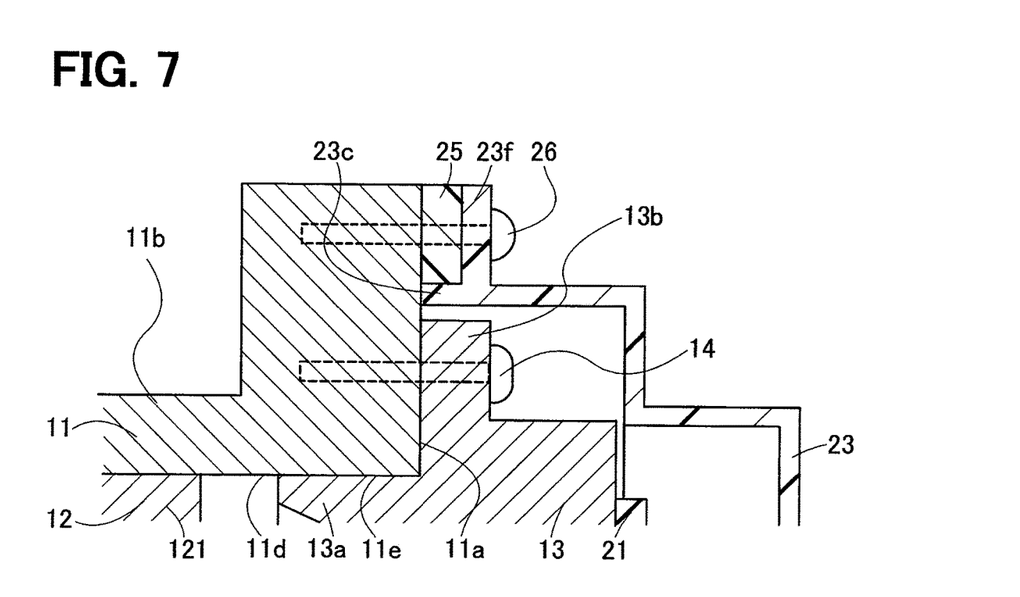
FIG. 7 is an enlarged view of an electric motor according to a second embodiment of the present disclosure.

Next, the electric motor 10 according to a second embodiment will be explained with reference to FIG. 7. In contrast to the first embodiment, the frame 11 and the motor cover 23 of the present embodiment are not joined with the adhesive 24. A pressing strip 23f protrudes radially outward from the joining end 23c of the motor cover 23. When joining the motor cover 23 to the frame 11, a gasket 25 (corresponding to a seal member) is interposed between the pressing strip 23f and the front end 11a. The gasket 25 is formed in a ring shape from an elastic synthetic rubber material or synthetic resin material.

While the gasket 25 is interposed between the pressing piece 23f and the front end 11a, a plurality of fastening bolts 26 that penetrate through the pressing piece 23f and the gasket 25 are fastened to the front end 11a in the axis of rotation direction. The fastening bolts 26 fastened until the tip of the joining end 23c abuts the front end 11a, thereby joining the motor cover 23 to the frame 11. When the fastening bolts 26 are fastened, the gasket 25 is compressed between the pressing piece 23f and the front end 11a. Accordingly, the motor cover 23 and the frame 11 are joined in a liquid-tight manner. Other configurations are the same as those of the first embodiment, and explanations thereof are omitted for brevity.

(Effects of Second Embodiment)

According to the present embodiment, the gasket 25 is interposed between the pressing piece 23f of the motor cover 23 and the front end 11a of the frame 11. Then, the fastening bolts 26 which penetrate through motor cover 23 are fastened to the frame 11 in the axis of rotation direction. As a result, the gasket 25 is compressed, and the motor cover 23 is joined to the front end 11a in a liquid-tight manner. Accordingly, the junction structure between the motor cover 23 and the front end 11a is more resistant to time wear, and resists vibrations and such from the vehicle 70. Thus, a liquid-tight seal between the inside and outside of the electric motor 10 may be maintained for a long time.

(Other Embodiments)

The present disclosure is not limited to the above described embodiments, and a variety of modifications are contemplated.

The frame 11 and the motor cover 23 may be formed by a synthetic resin material, such that the motor cover 23 is joined to the frame 11 in a liquid-tight manner by fusing.

The descriptions of the present disclosure may be applied to an electric generator that generates electric power at the stator 12 when the rotor 18 rotates.

Further, the descriptions of the present disclosure may be applied to an electric motor/generator that acts as both an electric generator and an electric motor.

The invention claimed is:

1. A rotating electrical machine, comprising:
   a housing integrally formed of
     a cylinder portion having one end in an axis of rotation direction, the one end being open, and
     a bottom portion connected to an other end of the cylinder portion in the axis of rotation direction, the bottom portion extending inward in a radial direction;
   a stator fixed to an inner circumferential surface of the cylinder portion;
   a rotor rotatably mounted in the housing to face the stator in the radial direction;
   a heat sink disposed to close an opening of the housing;
   a control substrate connected to the heat sink, the control substrate controlling a supply of electric power to the stator;
   a cover member having a joining portion joined to the one end of the housing in a liquid-tight manner to cover the heat sink, the cover member being integrally formed; and
   an adhesive that joins the joining portion with the one end of the housing, wherein
   the one end of the housing includes an adhesive groove having a fixed depth in the axis of rotation direction,
   the adhesive groove is filled with the adhesive, and
   the joining portion is inserted into the adhesive groove along the axis of rotation direction.

2. The rotating electrical machine of claim 1, wherein
   the cover member includes a stopper portion that extends from the joining portion in the radial direction, and
   the stopper portion abuts the one end of the housing in the axis of rotation direction.

3. The rotating electrical machine of claim 1, wherein
   a fixed liquidity gap is disposed between a tip of the joining portion and a bottom surface of the adhesive groove.

4. The electric rotating machine of claim 1, further comprising:
   a first bearing mounted at an inner periphery edge of the bottom portion;
   a second bearing mounted at an inner periphery portion of the heat sink; and
   a shaft rotatably mounted in the housing and the heat sink through the first bearing and the second bearing, the rotor being fixed to the shaft.

5. The rotating electrical machine of claim 1, wherein
   the rotating electrical machine is included in an electric power steering device, and
   the rotating electrical machine provides assisting steering force to wheels of a vehicle.

6. A rotating electrical machine, comprising:
   a housing integrally formed of
     a cylinder portion having one end in an axis of rotation direction, the one end being open, and
     a bottom portion connected to an other end of the cylinder portion in the axis of rotation direction, the bottom portion extending inward in a radial direction;
   a stator fixed to an inner circumferential surface of the cylinder portion;
   a rotor rotatably mounted in the housing to face the stator in the radial direction;
   a heat sink disposed to close an opening of the housing;
   a control substrate connected to the heat sink, the control substrate controlling a supply of electric power to the stator;
   a cover member having a joining portion joined to the one end of the housing in a liquid-tight manner to cover the heat sink, the cover member being integrally formed;
   a fastener which penetrates the heat sink to fix the heat sink to the housing; and
   an adhesive that joins the joining portion with the one end of the housing, wherein
   the one end of the housing includes an adhesive groove having a fixed depth in the axis of rotation direction,
   the adhesive groove is filled with the adhesive,
   the joining portion is inserted into the adhesive groove along the axis of rotation direction,
   the fastener is disposed radially outward of a radial end portion of the control substrate in the radial direction, and
   the joining portion is disposed radially outward of the fastener in the radial direction.

7. A rotating electrical machine, comprising:
   a housing integrally formed of
     a cylinder portion having one end in an axis of rotation direction, the one end being open, and
     a bottom portion connected to an other end of the cylinder portion in the axis of rotation direction, the bottom portion extending inward in a radial direction;
   a stator fixed to an inner circumferential surface of the cylinder portion;
   a rotor rotatably mounted in the housing to face the stator in the radial direction;
   a heat sink disposed to close an opening of the housing;
   a control substrate connected to the heat sink, the control substrate controlling a supply of electric power to the stator;
   a cover member having a body portion that covers the heat sink and a joining portion that protrudes from an end of the body portion in the axis of rotation direction to extend in the axis of rotation direction, the joining portion being joined to the one end of the housing in a liquid-tight manner, the cover member being integrally formed; and
   an adhesive that joins the joining portion with the one end of the housing, wherein
   the one end of the housing includes an adhesive groove having a fixed depth in the axis of rotation direction,
   the adhesive groove is filled with the adhesive,
   the joining portion is inserted into the adhesive groove along the axis of rotation direction,
   the cover member includes a stopper portion that extends in the radial direction from the end of the body portion, and
   the stopper portion abuts the one end of the housing in the axis of rotation direction.

* * * * *